US010500763B2

(12) United States Patent
Kalyanaraman et al.

(10) Patent No.: US 10,500,763 B2
(45) Date of Patent: Dec. 10, 2019

(54) MANUFACTURABILITY OF AMORPHOUS POLYMERS IN POWDER BED FUSION PROCESSES

(71) Applicant: SABIC GLOBAL TECHNOLOGIES B.V., Bergen op Zoom (NL)

(72) Inventors: Viswanathan Kalyanaraman, Newburgh, IN (US); Chiel Albertus Leenders, Fijnaart (NL); Hao Gu, Bergen op Zoom (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 65 days.

(21) Appl. No.: 15/738,190

(22) PCT Filed: Jun. 22, 2016

(86) PCT No.: PCT/US2016/038631
§ 371 (c)(1),
(2) Date: Dec. 20, 2017

(87) PCT Pub. No.: WO2016/209870
PCT Pub. Date: Dec. 29, 2016

(65) Prior Publication Data
US 2018/0178413 A1 Jun. 28, 2018

Related U.S. Application Data

(60) Provisional application No. 62/183,327, filed on Jun. 23, 2015.

(51) Int. Cl.
B33Y 10/00 (2015.01)
B29B 13/00 (2006.01)
B33Y 70/00 (2015.01)
B33Y 40/00 (2015.01)
B29C 64/153 (2017.01)
C08G 64/40 (2006.01)
C08G 73/10 (2006.01)
C08J 3/12 (2006.01)
C08J 3/14 (2006.01)
B33Y 80/00 (2015.01)
B29K 69/00 (2006.01)
B29K 79/00 (2006.01)

(52) U.S. Cl.
CPC .......... *B29B 13/007* (2013.01); *B29C 64/153* (2017.08); *B33Y 10/00* (2014.12); *B33Y 40/00* (2014.12); *B33Y 70/00* (2014.12); *C08G 64/40* (2013.01); *C08G 73/1053* (2013.01); *C08J 3/12* (2013.01); *C08J 3/14* (2013.01); *B29K 2069/00* (2013.01); *B29K 2079/085* (2013.01); *B29K 2995/0039* (2013.01); *B33Y 80/00* (2014.12); *C08G 2140/00* (2013.01); *C08G 2250/00* (2013.01); *C08J 2369/00* (2013.01); *C08J 2379/08* (2013.01)

(58) Field of Classification Search
USPC ........................................................ 428/412
See application file for complete search history.

(56) References Cited

U.S. PATENT DOCUMENTS

| | | | |
|---|---|---|---|
| 3,214,407 A | 10/1965 | Butterworth et al. | |
| 3,267,074 A | 8/1966 | Wood | |
| 3,991,004 A | 11/1976 | Takekoshi et al. | |
| 4,778,858 A * | 10/1988 | Ginnings ............... | C08G 63/80 525/425 |
| 5,204,377 A | 4/1993 | Fukawa et al. | |
| 5,342,919 A | 8/1994 | Dickens, Jr. et al. | |
| 5,523,361 A * | 6/1996 | Tung ..................... | C08G 63/88 525/439 |
| 5,932,687 A | 8/1999 | Baumann et al. | |
| 6,136,948 A | 10/2000 | Dickens, Jr. et al. | |
| 6,531,086 B1 | 3/2003 | Larsson | |
| 7,794,647 B1 | 9/2010 | Deckard | |
| 8,361,364 B2 * | 1/2013 | Eloo ....................... | B29B 9/065 264/143 |
| 2003/0181626 A1 | 9/2003 | Lindway | |
| 2005/0003189 A1 | 1/2005 | Bredt et al. | |
| 2006/0223928 A1 | 10/2006 | Monsheimer et al. | |
| 2007/0241482 A1 | 10/2007 | Giller et al. | |
| 2011/0293918 A1 | 12/2011 | Lucas et al. | |
| 2014/0295363 A1 | 10/2014 | Sun et al. | |
| 2015/0024316 A1 | 1/2015 | Orrock et al. | |
| 2015/0152233 A1 | 6/2015 | Corriol | |

FOREIGN PATENT DOCUMENTS

| | | |
|---|---|---|
| DE | 4421454 A1 | 12/1995 |
| EP | 0376653 A2 | 7/1990 |
| EP | 0431924 A2 | 6/1991 |
| JP | 2002265591 A | 9/2002 |
| KR | 20040016514 A | 2/2004 |
| KR | 100878453 B1 | 1/2009 |
| WO | 9606881 | 3/1996 |
| WO | 0138061 A1 | 5/2001 |
| WO | 02102576 A1 | 12/2002 |
| WO | 2013175448 A1 | 11/2013 |
| WO | 2013186120 A1 | 12/2013 |
| WO | 2014072923 | 5/2014 |

OTHER PUBLICATIONS

Cox et al.; International Application No. PCT/US2015/024452; entitled "Powder Bed Fusing Thermoplastic Polymers"; International Filing Date Apr. 6, 2015; pp. 1-27.

(Continued)

Primary Examiner — Terressa Boykin
(74) Attorney, Agent, or Firm — Cantor Colburn LLP

(57) ABSTRACT

A method of making an article includes converting a first amorphous polymer to an at least partially crystalline polymeric powder composition and powder bed fusing the at least partially crystalline polymer powder composition to form a three-dimensional article including a second amorphous polymer.

20 Claims, No Drawings

(56) References Cited

OTHER PUBLICATIONS

Hwang et al., "Crystallization of Polycarbonate in Solvent/Nonsolvent System and Its Application to High-Denisty Polyethylene Composite as a Filler", Polymer Engineering and Science, vol. 54, No. 8, XP055316639. Aug. 29, 2013, pp. 1893-1899.
International Search Report International Application No. PCT/US2016/038631, International Filing Date Jun. 22, 2016, dated Oct. 6, 2016. 6 pages.
Matteazzi; "Final Report Summary—STEPUP (Step Up in Polymer Based RM Processes)"; European Union, Project Reference No. 213927; 2014; pp. 1-14.
Sohn; "Crystallization Behavior of Bisphenol—A Polycarbonate: Effects of Crystallization Time, Temperature, and Molar Mass"; Virginia Polytechnic Institute and State University; Apr. 2000; pp. 1-263.
Written Opinion for International Application No. PCT/US2016/038631, International Filing Date Jun. 22, 2016, dated Oct. 6, 2016, 6 pages.
International Preliminary Report on Patentability for International Application No. PCT/US2016/038631; International filing date Jun. 22, 2016; dated Jun. 2, 2017; 16 pages.
Chen et al., "Gas phase induced crystallization and morphology of bisphenol A polycarbonate", Fudan University; pp. 6-9.

* cited by examiner

MANUFACTURABILITY OF AMORPHOUS POLYMERS IN POWDER BED FUSION PROCESSES

This application is a national stage application of PCT/US2016/038631, filed Jun. 22, 2016, which claims priority to U.S. Provisional Patent Application No. 62/183,327 filed Jun. 23, 2015, both of which are hereby incorporated by reference in their entirety.

BACKGROUND

Powder bed fusing is an additive manufacturing process in which thermal energy selectively fuses regions of a powder bed. It is difficult to employ amorphous polymer powders in powder bed fusing processes because they generally do not have a sharp melting point. Instead, they generally have a gradual melting range. This property causes the applied thermal energy source (e.g., a laser beam) in a powder bed fusing process to be disadvantageously dissipated into the regions surrounding where the energy beam strikes the bed. This undesired dissipation of thermal energy can cause unstable processing as well as poor feature resolution in the intended three dimensional articles being produced. However, most amorphous polymers such as polycarbonates or polyetherimides have low shrinkage properties, which can cause less warpage in the final article being produced. Thus, a need remains in the art for methods that allow amorphous polymers to be used in powder bed fusion processes.

BRIEF DESCRIPTION

The above described and other features are exemplified by the following figures and detailed description.

One embodiment is a method of making an article, the method comprising converting a first amorphous polymer to an at least partially crystalline polymeric powder composition and powder bed fusing the at least partially crystalline polymer powder composition to form a three-dimensional article comprising a second amorphous polymer.

Also described herein are the articles produced by the methods described above.

The above described and other features are exemplified by the following detailed description, examples, and claims.

DETAILED DESCRIPTION

Disclosed herein are methods that include converting an amorphous polymer to an at least partially crystalline polymeric powder composition and powder bed fusing the at least partially crystalline polymer powder composition to form a three-dimensional article. The methods can have one or more of the following advantages. For example, due to having crystalline polymeric materials in the powder bed, this method can exhibit a sharp melting point and excellent melting behavior, resulting in excellent dimensional control and feature resolution in the articles produced. Also, the crystalline nature of the polymeric material allows for ease of processing. Moreover, the use of these crystalline polymeric materials also results in lower required melting energy versus the melting of corresponding amorphous polymeric materials. And, since these crystalline polymeric materials revert back to an amorphous form after melting in the powder bed, thus having less shrinkage behavior and therefore less cooling time is needed. This results in less chance of the articles produced having warpage. If the first amorphous polymer is transparent, like polycarbonates and polyetherimides, transparent three dimensional articles can be produced.

The term "first amorphous polymer" as used herein refers to any amorphous polymer that can be at least partially converted into a crystalline polymeric material by a process that includes, but is not limited to, the crystallization processes of solvent induced crystallization (SINC), vapor induced crystallization (VINC); or plasticizer or nucleating agent (organic or inorganic) induced crystallization, or a combination comprising at least one of the foregoing, and that crystalline polymeric material is powder bed fused to form a three-dimensional article composed of a second amorphous polymer. The crystalline polymeric powder composition will then revert back to a second amorphous polymer after heating above the melting point of the polymer, resulting in the above-noted advantages of having third dimensional article made of an amorphous polymeric material. The amorphous polycarbonates and amorphous polyetherimides noted below are examples of these amorphous polymers. Combinations of different amorphous polymers can also be used herein.

The term "second amorphous polymer" as used herein refers to any amorphous polymer that was formed by having the first amorphous polymer, as defined above, at least partially converted into a crystalline polymeric material by a process that includes the a crystallization process of solvent induced crystallization (SINC), vapor induced crystallization (VINC); or plasticizer or nucleating agent (organic or inorganic) induced crystallization, or a combination comprising at least one of the foregoing, and that crystalline polymeric material was then powder bed fused to form a three-dimensional article composed of this second amorphous polymer. The crystalline polymeric powder composition reverts back to this second amorphous polymer after heating above the melting point of the polymer, resulting in the advantages of having third dimensional article made of an amorphous polymeric material. In some embodiments, the second amorphous polymer can have the same amorphous structure as the first amorphous polymer. In other embodiments the second amorphous polymer does not have the same amorphous structure as the first amorphous polymer It can have a different amorphous structure. Alternatively or in addition, the second amorphous polymer can have a different weight average molecular weight than the first amorphous polymer.

The phrase "at least partially crystallizing comprising" as used here refers to any process that employs suitable crystallization process of converting the first amorphous polymer to the crystalline polymer. These include, but are not limited to, solvent induced crystallization (SINC), vapor induced crystallization (VINC); plasticizer or nucleating agent (organic or inorganic) induced crystallization, or a combination comprising at least one of the foregoing. Such processes can also include other steps such as size reduction processes to the crystalline polymeric material, cooling the crystalline polymeric material or adding other materials to the crystalline polymeric material or other steps. The term "at least partially" as used herein means that not all, but only a portion, of the amorphous polymer has to be converted to a crystalline form. Exemplary embodiments of "at least partially" in this context include 100% by weight of the first amorphous polymer is converted to the crystalline polymer; 80% to 100% by weight of the first amorphous polymer is converted to the crystalline polymer; 90% to 100% by weight of the first amorphous polymer is converted to the crystalline polymer; or 95% to 100% by weight of the first amorphous polymer is converted to the crystalline polymer. The terms "amorphous polymer" and "crystalline polymer" as used herein mean their usual meanings in the polymer art. For example, in an amorphous polymer the molecules can be oriented randomly and can be intertwined, much like cooked spaghetti, and the polymer can have a glasslike, transparent appearance. In crystalline polymers, the polymer molecules can be aligned together in ordered regions, much like uncooked spaghetti. In the polymer art, some types of crystalline polymers are sometimes referred to as semi-crystalline polymers. The term "crystalline polymer" as used herein refers to both crystalline and semi-crystalline polymers.

The term "solvent induced crystallization" (also referred to as SINC) as used herein refers to any process in the art wherein the amorphous polymer is crystallized using a solvent or non-solvent.

The term "vapor induced crystallization" (also referred to as VINC) as used herein refers to any process in the art wherein the amorphous polymers is crystallized upon evaporation of a solvent or exposure to a solvent vapor.

The term "plasticizer or nucleating agent (organic or inorganic) induced crystallization" as used herein refers to any process in the art wherein the amorphous polymer is crystallized by using any plasticizer or any nucleating agent (organic or inorganic) to induce crystallization.

The term "powder bed fusing" is used herein to mean all laser sintering and all selective laser sintering processes as well as other powder bed fusion processes as well as other powder bed fusing technologies as defined by ASTM F2792-12a.

For example, sintering of the powder composition can be accomplished via application of electromagnetic radiation other than that produced by a laser, with the selectivity of the sintering achieved, for example, through selective application of inhibitors, absorbers, susceptors, or the electromagnetic radiation (e.g., through use of masks or directed laser beams). Any other suitable source of electromagnetic radiation can be used, including, for example, infrared radiation sources, microwave generators, lasers, radiative heaters, lamps, or a combination thereof. In some embodiments, selective mask sintering ("SMS") techniques can be used to produce three-dimensional articles of the invention. For further discussion of SMS processes, see for example U.S. Pat. No. 6,531,086 which describes an SMS machine in which a shielding mask is used to selectively block infrared radiation, resulting in the selective irradiation of a portion of a powder layer. If using an SMS process to produce articles from powder compositions of the invention, it can be desirable to include one or more materials in the powder composition that enhance the infrared absorption properties of the powder composition. For example, the powder composition can include one or more heat absorbers or dark-colored materials (e.g., carbon black, carbon nanotubes, or carbon fibers).

Also included herein are all three dimensional products made by powder bed fusing these powder compositions. After a layer-by-layer manufacture of an article of manufacture, the article can exhibit excellent resolution, durability, and strength. These articles of manufacture can have a wide variety of uses, including as prototypes and as end products as well as molds for end products.

In particular, powder bed fused (e.g., laser sintered) articles can be produced from the powder compositions using any suitable powder bed fusing processes including laser sintering processes. These articles can include a plurality of overlying and adherent sintered layers that include a polymeric matrix which, in some embodiments, have reinforcement particles dispersed throughout the polymeric matrix. Laser sintering processes are sufficiently well known, and are based on the selective sintering of polymer particles, where layers of polymer particles are briefly exposed to laser light and the polymer particles exposed to the laser light are thus bonded to one another. Successive sintering of layers of polymer particles produces three-dimensional objects. Details concerning the selective laser sintering process are found, by way of example, in the specifications U.S. Pat. No. 6,136,948 and WO 96/06881. However, the powder described herein can also be used in other rapid prototyping or rapid manufacturing processing of the prior art, in particular in those described above. For example, the powder can in particular be used for producing moldings from powders via the SLS (selective laser sintering) process, as described in U.S. Pat. No. 6,136,948 or WO 96/06881, via the SIB process (selective inhibition of bonding of powder), as described in WO 01/38061, via 3D printing, as described in EP 0 431 924, or via a microwave process, as described in DE 103 11 438. The specifications cited, and in particular the processes described therein, are expressly incorporated into the disclosure content of the present description of the invention by way of reference.

In some embodiments of the methods, a plurality of layers is formed in a preset pattern by an additive manufacturing process. "Plurality" as used in the context of additive manufacturing includes 5 or more layers. The maximum number of layers can vary greatly, determined, for example, by considerations such as the size of the article being manufactured, the technique used, the capabilities of the equipment used, and the level of detail desired in the final article. For example, 5 to 100.000 layers can be formed, or 50 to 50,000 layers can be formed.

As used herein, "layer" is a term of convenience that includes any shape, regular or irregular, having at least a predetermined thickness. In some embodiments, the size and configuration two dimensions are predetermined, and on some embodiments, the size and shape of all three dimensions of the layer is predetermined. The thickness of each layer can vary widely depending on the additive manufacturing method and particle size. In some embodiments the thickness of each layer as formed differs from a previous or subsequent layer. In some embodiments, the thickness of each layer is the same. In some embodiments the thickness of each layer as formed is 50 micrometers (microns) to 500 micrometers (microns).

The preset pattern can be determined from a three-dimensional digital representation of the desired article as is known in the art and described in further detail below.

The fused layers of powder bed fused articles herein can be of any thickness suitable for selective laser sintered processing. The plurality of layers can be each, on average, preferably at least 50 micrometers (microns) thick, more preferably at least 80 microns thick, and even more preferably at least 100 micrometers (microns) thick. In a preferred embodiment, the plurality of sintered layers are each, on average, preferably less than 500 micrometers (microns) thick, more preferably less than 300 micrometers (microns) thick, and even more preferably less than 200 micrometers (microns) thick. Thus, the layers for some embodiments can be 50-500, 80-300, or 100-200 micrometers (microns) thick. Three-dimensional articles produced from powder compositions of the invention using a layer-by-layer powder bed fusing processes other than selective laser sintering can have layer thicknesses that are the same or different from those described above.

Two examples of amorphous polymers include polycarbonate polymers and polyetherimide polymers.

Polycarbonate" as used herein means a polymer or copolymer having repeating structural carbonate units of formula (1)

wherein at least 60 percent of the total number of $R^1$ groups are aromatic, or each $R^1$ contains at least one $C_{6-30}$ aromatic group. Specifically, each $R^1$ can be derived from a dihydroxy compound such as an aromatic dihydroxy compound of formula (2) or a bisphenol of formula (3).

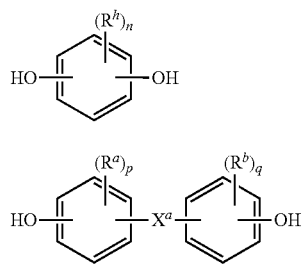

In formula (2), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (3), $R^a$ and $R^b$ are each independently a halogen, $C_{3-12}$ alkoxy, or $C_{1-12}$ alkyl, and p and q are each independently integers of 0 to 4, such that when p or q is less than 4, the valence of each carbon of the ring is filled by hydrogen. In an embodiment, p and q is each 0, or p and q is each 1, and $R^a$ and $R^b$ are each a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

Some illustrative examples of dihydroxy compounds that can be used are described, for example, in WO 2013/175448 A1, US 2014/0295363, and WO 2014/072923.

Specific dihydroxy compounds include resorcinol, 2,2-bis(4-hydroxyphenyl) propane ("bisphenol A" or "BPA", in which in which each of $A^1$ and $A^2$ is p-phenylene and $Y^1$ is isopropylidene in formula (3)), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl) cyclohexane, and 1,1-bis(4-hydroxy-3-methylphenyl)-3,3,5-trimethylcyclohexane (isophorone bisphenol).

"Polycarbonate" as used herein also includes copolymers comprising carbonate units and ester units ("poly(ester-carbonate)s", also known as polyester-polycarbonates). Poly(ester-carbonate)s further contain, in addition to recurring carbonate chain units of formula (1), repeating ester units of formula (4)

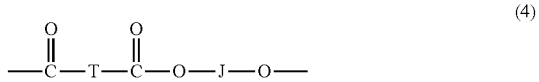

wherein J is a divalent group derived from a dihydroxy compound (which includes a reactive derivative thereof), and can be, for example, a $C_{2-10}$ alkylene, a $C_{6-20}$ cycloalkylene a $C_{6-20}$ arylene, or a polyoxyalkylene group in which the alkylene groups contain 2 to 6 carbon atoms, specifically, 2, 3, or 4 carbon atoms; and T is a divalent group derived from a dicarboxylic acid (which includes a reactive derivative thereof), and can be, for example, a $C_{2-20}$ alkylene, a $C_{6-20}$ cycloalkylene, or a $C_{6-20}$ arylene. Copolyesters containing a combination of different T or J groups can be used. The polyester units can be branched or linear.

Specific dihydroxy compounds include aromatic dihydroxy compounds of formula (2) (e.g., resorcinol), bisphenols of formula (3) (e.g., bisphenol A), a $C_{1-8}$ aliphatic diol such as ethane diol, n-propane diol, i-propane diol, 1,4-butane diol, 1,6-cyclohexane diol, 1,6-hydroxymethylcyclohexane, or a combination comprising at least one of the foregoing dihydroxy compounds. Aliphatic dicarboxylic acids that can be used include $C_{6-20}$ aliphatic dicarboxylic acids (which includes the terminal carboxyl groups), specifically linear $C_{8-12}$ aliphatic dicarboxylic acid such as decanedioic acid (sebacic acid); and alpha, omega-$C_{12}$ dicarboxylic acids such as dodecanedioic acid (DDDA). Aromatic dicarboxylic acids that can be used include terephthalic acid, isophthalic acid, naphthalene dicarboxylic acid, 1,6-cyclohexane dicarboxylic acid, or a combination comprising at least one of the foregoing acids. A combination of isophthalic acid and terephthalic acid wherein the weight ratio of isophthalic acid to terephthalic acid is 91:9 to 2:98 can be used.

Specific ester units include ethylene terephthalate units, n-propylene terephthalate units, n-butylene terephthalate units, ester units derived from isophthalic acid, terephthalic acid, and resorcinol (ITR ester units), and ester units derived from sebacic acid and bisphenol A. The molar ratio of ester units to carbonate units in the poly(ester-carbonate)s can vary broadly, for example 1:99 to 99:1, specifically, 10:90 to 90:10, more specifically, 25:75 to 75:25, or from 2:98 to 15:85.

The polycarbonates can have an intrinsic viscosity, as determined in chloroform at 25° C., of 0.3 to 1.5 deciliters per gram (dl/gm), specifically 0.45 to 1.0 dl/gm. The polycarbonates can have a weight average molecular weight of 5,000 to 200,000 Daltons, specifically 15,000 to 100,000 Daltons, as measured by gel permeation chromatography (GPC), using a crosslinked styrene-divinylbenzene column and calibrated to polycarbonate references. GPC samples are prepared at a concentration of 1 mg per ml, and are eluted at a flow rate of 1.5 ml per minute.

The term "polyetherimide" is used herein to mean a compound comprising more than 1, for example 2 to 1000, or 5 to 500, or 10 to 100 structural units of formula (5)

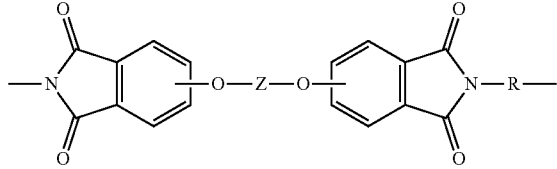

(5)

wherein each R is independently the same or different, and is a substituted or unsubstituted divalent organic group, such as a substituted or unsubstituted $C_{6-20}$ aromatic hydrocarbon group, a substituted or unsubstituted straight or branched chain $C_{4-20}$ alkylene group, a substituted or unsubstituted $C_{3-8}$ cycloalkylene group, in particular a halogenated derivative of any of the foregoing. In some embodiments R is divalent group of one or more of the following formulas (6)

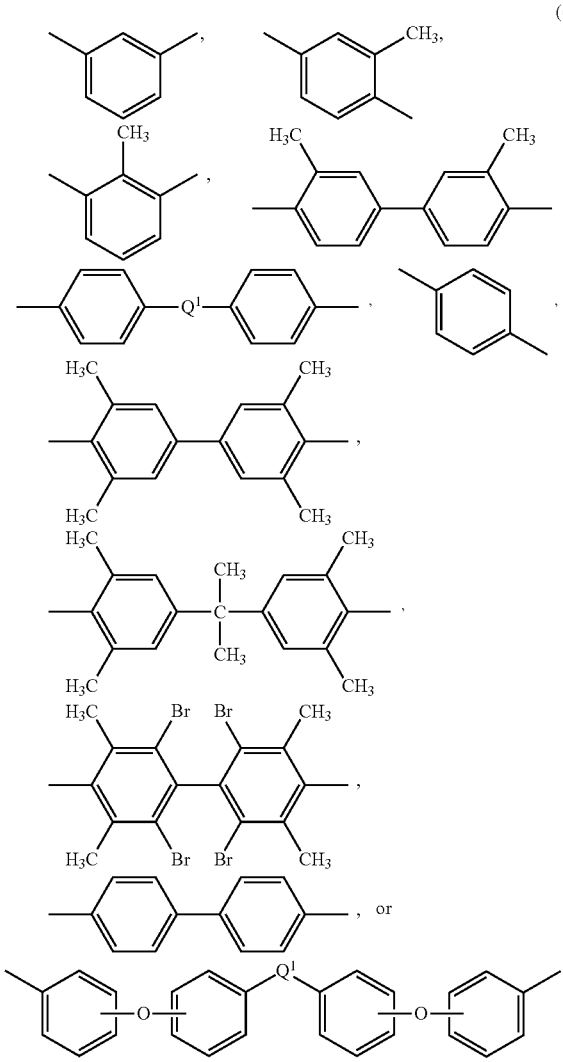

(6)

wherein $Q^1$ is —O—, —S—, —C(O)—, —SO$_2$—, —SO—, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In some embodiments R is m-phenylene, p-phenylene, or a diarylene sulfone, in particular bis(4,4'-phenylene)sulfone, bis(3,4'-phenylene)sulfone, bis(3,3'-phenylene)sulfone, or a combination comprising at least one of the foregoing. In some embodiments, at least 10 mole percent of the R groups contain sulfone groups, and in other embodiments no R groups contain sulfone groups. Further in formula (5), the divalent bonds of the —O—Z—O— group are in the 3,3', 3,4', 4,3', or the 4,4' positions, and Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, provided that the valence of Z is not exceeded. Exemplary groups Z include groups of formula (7)

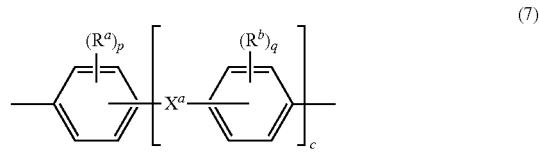

(7)

wherein $R^a$ and $R^b$ are each independently the same or different, and are a halogen atom or a monovalent $C_{1-6}$ alkyl group, for example; p and q are each independently integers of 0 to 4; c is 0 to 4; and $X^a$ is a bridging group connecting the hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be a single bond. —O—, —S—, —S(O)—, —S(O)$_2$—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of formula (7a)

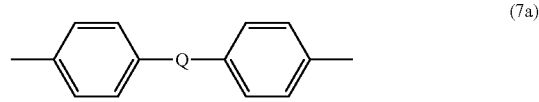

(7a)

wherein Q is —O—, —S—, —C(O)—, —SO$_2$—, —SO—, or —C$_y$H$_{2y}$— wherein y is an integer from 1 to 5 or a halogenated derivative thereof (including a perfluoroalkylene group). In a specific embodiment Z is a derived from bisphenol A, such that Q in formula (3a) is 2,2-isopropylidene.

In an embodiment in formula (5), R is m-phenylene, p-phenylene, or a combination comprising at least one of the forgoing, and T is —O—Z—O— wherein Z is a divalent group of formula (7a). Alternatively. R is m-phenylene, p-phenylene, or a combination comprising at least one of the forgoing, and T is —O—Z—O wherein Z is a divalent group of formula (7a) and Q is 2,2-isopropylidene. Alternatively, the polyetherimide can be a copolymer optionally comprising additional structural polyetherimide units, for example imide units of formula (5) wherein R is as described in formula (5) wherein at least 50 mole percent % (mol %) of the R groups are bis(3,4'-phenylene)sulfone, bis(3,3'-phenylene)sulfone, or a combination comprising at least one of the foregoing and the remaining R groups are p-phenylene, or m-phenylene or a combination comprising at least one of the foregoing; and Z is 2,2-(4-phenylene)isopropylidene, i.e., a bisphenol A moiety.

In some embodiments, the polyetherimide is a copolymer that optionally comprises additional structural imide units that are not polyetherimide units, for example imide units of formula (8)

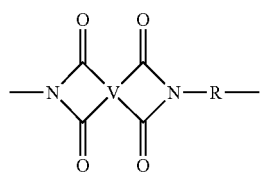
(8)

wherein R is as described in formula (5) and each V is the same or different, and is a substituted or unsubstituted $C_{6-20}$ aromatic hydrocarbon group, for example, T is a tetravalent linker of the formulas

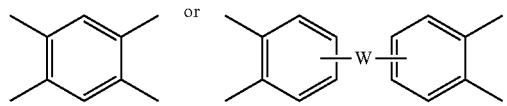

wherein W is a single bond, —S—, —C(O)—, —SO$_2$—, —SO—, or —$C_yH_{2y}$— wherein y is an integer from 1 to 5 or a halogenated derivative thereof (which includes perfluoroalkylene groups). These additional structural imide units preferably comprise less than 20 mol % of the total number of units, and more preferably can be present in amounts of 0 to 10 mol % of the total number of units, or 0 to 5 mol % of the total number of units, or 0 to 2 mole % of the total number of units. In some embodiments, no additional imide units are present in the polyetherimide.

The polyetherimide can be prepared by any of the methods well known to those skilled in the art, including the reaction of an aromatic bis(ether anhydride) of formula (9)

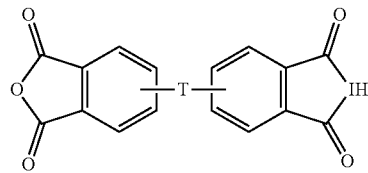
(9)

with an organic diamine of formula (10)

(10)

wherein T and R are defined as described above. Copolymers of the polyetherimides can be manufactured using a combination of an aromatic bis(ether anhydride) of formula (9) and an additional bis(anhydride) that is not a bis(ether anhydride), for example, pyromelletic dianhydride or bis(3,4-dicarboxyphenyl) sulfone dianhydride.

Illustrative examples of aromatic bis(ether anhydride)s include 2,2-bis[4-(3,4-dicarboxyphenoxy)phenyl]propane dianhydride (also known as bisphenol A dianhydride or BPADA), 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy) benzophenone dianhydride; 4,4'-bis(2,3-dicarboxyphenoxy) diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy) benzophenone dianhydride; 4,4'-(hexafluoroisopropylidene) diphthalic anhydride; and 4-(2,3-dicarboxyphenoxy)-4'-(3,4-dicarboxyphenoxy)diphenyl sulfone dianhydride. A combination of different aromatic bis(ether anhydride)s can be used.

Examples of organic diamines include 1,4-butane diamine, 1,5-pentanediamine, 1,6-hexanediamine, 1,7-heptanediamine, 1,8-octanediamine, 1,9-nonanediamine, 1,10-decanediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2, 2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1, 3-diamino-4-isopropylbenzene, bis(4-aminophenyl) sulfide, bis-(4-aminophenyl) sulfone (also known as 4,4'-diaminodiphenyl sulfone (DDS)), and bis(4-aminophenyl) ether. Any regioisomer of the foregoing compounds can be used. $C_{1-4}$ alkylated or poly($C_{1-4}$)alkylated derivatives of any of the foregoing can be used, for example a polymethylated 1,6-hexanediamine. Combinations of these compounds can also be used. In some embodiments the organic diamine is m-phenylenediamine, p-phenylenediamine, 4,4'-diaminodiphenyl sulfone, 3,4'-diaminodiphenyl sulfone, 3,3'-diaminodiphenyl sulfone, or a combination comprising at least one of the foregoing.

The polyetherimides can have a melt index of 0.1 to 10 grams per minute (g/min), as measured by American Society for Testing Materials (ASTM) D1238 at 340 to 370° C. using a 6.7 kilogram (kg) weight. In some embodiments, the polyetherimide has a weight average molecular weight (Mw) of 1,000 to 150,000 grams/mole (Dalton), as measured by gel permeation chromatography, using polystyrene standards. In some embodiments the polyetherimide has an Mw of 10,000 to 80,000 Daltons. Such polyetherimide polymers can have an intrinsic viscosity greater than 0.2 deciliters per gram (dl/g), or, more specifically, 0.35 to 0.7 dl/g as measured in m-cresol at 25° C.

The thermoplastic "polyetherimide" composition can also comprise a poly(siloxane-etherimide) copolymer comprising polyetherimide units of formula (1) and siloxane blocks of formula (11).

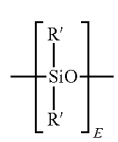
(11)

wherein E has an average value of 2 to 100, 2 to 31, 5 to 75, 5 to 60, 5 to 15, or 15 to 40, and each R' is independently a $C_{1-13}$ monovalent hydrocarbyl group. For example, each R' can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination comprising at least one of the foregoing. In an embodiment no bromine or chlorine is present, and in another embodiment no halogens are present. Combinations of the foregoing R groups can be used in the same copolymer. In an embodiment, the polysiloxane blocks comprises R' groups that have minimal hydrocarbon content. In a specific embodiment, an R' group with a minimal hydrocarbon content is a methyl group The poly(siloxane-etherimide)s can be formed by polymerization of an aromatic bisanhydride (9) and a diamine component comprising an organic diamine (10) as described above or mixture of diamines, and a polysiloxane diamine of formula (12)

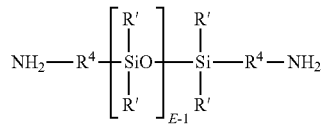
(12)

wherein R' and E are as described in formula (11), and $R^4$ is each independently a $C_2$-$C_{20}$ hydrocarbon, in particular a $C_2$-$C_{20}$ arylene, alkylene, or arylenealkylene group. In an embodiment $R^4$ is a $C_2$-$C_{20}$ alkyl group, specifically a $C_2$-$C_{20}$ alkyl group such as propylene, and E has an average value of 5 to 100, 5 to 75, 5 to 60, 5 to 15, or 15 to 40. Procedures for making the polysiloxane diamines of formula (12) are well known in the art.

In some poly(siloxane-etherimide)s the diamine component can contain 10 to 90 mole percent (mol %), or 20 to 50 mol %, or 25 to 40 mol % of polysiloxane diamine (12) and 10 to 90 mol %, or 50 to 80 mol %, or 60 to 75 mol % of diamine (10), for example as described in U.S. Pat. No. 4,404,350. The diamine components can be physically mixed prior to reaction with the bisanhydride(s), thus forming a substantially random copolymer. Alternatively, block or alternating copolymers can be formed by selective reaction of (10) and (12) with aromatic bis(ether anhydrides (9), to make polyimide blocks that are subsequently reacted together. Thus, the poly(siloxane-imide) copolymer can be a block, random, or graft copolymer.

Examples of specific poly(siloxane-etherimide) are described in U.S. Pat. Nos. 4,404,350, 4,808,686, and 4,690,997. In an embodiment, the poly(siloxane-etherimide) has units of formula (9)

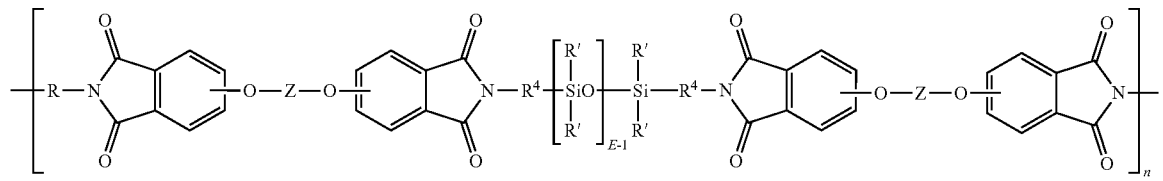
(13)

wherein R' and E of the siloxane are as in formula (9), the R and Z of the imide are as in formula (5), $R^4$ is the same as $R^4$ as in formula (12), and n is an integer from 5 to 100. In a specific embodiment, the R of the etherimide is a phenylene, Z is a residue of bisphenol A. $R^4$ is n-propylene. E is 2 to 50, 5, to 30, or 10 to 40, n is 5 to 100, and each R' of the siloxane is methyl.

The relative amount of polysiloxane units and etherimide units in the poly(siloxane-etherimide) depends on the desired properties, and are selected using the guidelines provided herein. In particular, as mentioned above, the block or graft poly(siloxane-etherimide) copolymer is selected to have a certain average value of E, and is selected and used in amount effective to provide the desired wt % of polysiloxane units in the composition. In an embodiment the poly(siloxane-etherimide) comprises 10 to 50 wt %, 10 to 40 wt %, or 20 to 35 wt % polysiloxane units, based on the total weight of the poly(siloxane-etherimide).

As used herein, the term "hydrocarbyl" includes groups containing carbon, hydrogen, and optionally one or more heteroatoms (e.g., 1, 2, 3, or 4 atoms such as halogen, O, N, S, P, or Si). "Alkyl" means a branched or straight chain, saturated, monovalent hydrocarbon group, e.g., methyl, ethyl, i-propyl, and n-butyl. "Alkylene" means a straight or branched chain, saturated, divalent hydrocarbon group (e.g., methylene ($-CH_2-$) or propylene ($-(CH_2)_3-$)). "Alkenyl" and "alkenylene" mean a monovalent or divalent, respectively, straight or branched chain hydrocarbon group having at least one carbon-carbon double bond (e.g., ethenyl ($-HC=CH_2$) or propenylene ($-HC(CH_3)=CH_2-$). "Alkynyl" means a straight or branched chain, monovalent hydrocarbon group having at least one carbon-carbon triple bond (e.g., ethynyl). "Alkoxy" means an alkyl group linked via an oxygen (i.e., alkyl-O—), for example methoxy, ethoxy, and sec-butyloxy. "Cycloalkyl" and "cycloalkylene" mean a monovalent and divalent cyclic hydrocarbon group, respectively, of the formula —C$_n$H$_{2n-x}$ and —C$_n$H$_{2n-2x}$— wherein x is the number of cyclization(s). "Aryl" means a monovalent, monocyclic or polycyclic aromatic group (e.g., phenyl or naphthyl). "Arylene" means a divalent, monocyclic or polycyclic aromatic group (e.g., phenylene or naphthylene). "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more halogen (F, Cl, Br. or I) substituents, which can be the same or different. The prefix "hetero" means a group or compound that includes at least one ring member that is a heteroatom (e.g., 1, 2, or 3 heteroatoms, wherein each heteroatom is independently N, O, S, or P.

"Substituted" means that the compound or group is substituted with at least one (e.g., 1, 2, 3, or 4) substituents instead of hydrogen, where each substituent is independently nitro (—NO$_2$), cyano (—CN), hydroxy (—OH), halogen, thiol (—SH), thiocyano (—SCN), C$_{1-6}$ alkyl, C$_{2-6}$ alkenyl, C$_{2-6}$ alkynyl, C$_{1-6}$ haloalkyl, C$_{1-9}$ alkoxy, C$_{1-6}$ haloalkoxy, C$_{3-2}$ cycloalkyl, C$_{5-18}$ cycloalkenyl, C$_{6-12}$ aryl, C$_{7-3}$ arylalkylene (e.g. benzyl), C$_{7-12}$ alkylarylene (e.g. toluyl), C$_{4-12}$ heterocycloalkyl, C$_{3-12}$ heteroaryl, C$_{1-6}$ alkyl sulfonyl (—S(=O)$_2$-alkyl), C$_{6-12}$ arylsulfonyl (—S(=O)$_2$-aryl), or tosyl (CH$_3$C$_6$H$_4$SO$_2$—), provided that the substituted atom's normal valence is not exceeded, and that the substitution does not significantly adversely affect the manufacture, stability, or desired property of the compound. When a compound is substituted, the indicated number of carbon atoms is the total number of carbon atoms in the group, including those of the substituent(s).

As exemplified in Example 1 below, a crystalline polymer such a polycarbonate can be made from a ground amorphous polymer powder by immersing that powder in a solvent such as acetone or the like. The solvent immersion causes the crystallization of the polymer chains. After separating out the solvent, these crystalline polymer chains are dried by heat with or without vacuum. The dried crystalline polymer chains can be ground again to a particle size of 10 micrometers (microns) to 500 micrometers (microns). These ground crystalline polymers can then be used directly in a powder bed fusing step, or can first be mixed with other polymer powders (either another crystalline polymer or an amorphous polymer, or a combination comprising at least one of the foregoing) or additives such as those listed below.

In other embodiments, very fine crystalline polycarbonate particles, such as those described in Examples 57-60 of European Patent Application No. EP0376653 (A2) can be used.

Selective laser sintering (SLS) systems for fabricating a part from a fusible powder can be used herein, and in particular for fabricating the part from fusible crystalline polycarbonate powder. Such SLS systems are well known. In one embodiment, one thin layer of PC powder is spread over the sintering chamber in the selective laser sintering (SLS) system. A laser beam traces the computer-controlled pattern, corresponding to the cross-section slice of the CAD model, to melt the powders selectively which has been preheated to slightly below its melting temperature. After one layer of powder is sintered, the powder bed piston below the sintering chamber is lowered with a predetermined increment (typically 100 μm), and another layer of powder is spread over the previous sintered layer by a leveling roller. This new layer of powder can be supplied by raising a piston below one or more powder cartridges adjacent to the sintering chamber by a predetermined increment The process then repeats as the laser melts and fuses each successive layer to the previous layer until the entire part is completed.

As exemplified in Example 2 below and also in US Published Patent Application No. 20030181626, a crystalline polymer such a polyetherimide can be made by reacting its precursors in a suitable solvent such as ortho-dichlorobenzene and then separating insoluble reactive polyimide from the reaction solution to form a reactive friable polyimide powder. As shown in Example 2 below, this reactive friable polyimide powder can be ground and was then found to exhibit crystallinity. These ground crystalline polymers can then be used directly in a powder bed fusing step, or can first be mixed with other polymer powders (either another crystalline polymer or an amorphous polymer, or a combination comprising at least one of the foregoing) or additives such as those listed below.

In PCT Application No. PCT/US2015/024452 filed on Apr. 6, 2015, an amorphous ultrafine, spherical thermoplastic polymer powder having a glass transition temperature (Tg) of at least 150° C. polymer powder was made. This amorphous ultrafine, spherical thermoplastic polymer can be converted into a crystalline polymer by immersing that powder in a solvent such as acetone or the like. The solvent immersion causes the crystallization of the polymer chains, resulting in an ultrafine, spherical crystalline polymer powder. After separating out the solvent, this crystalline polymer powder is dried by heat with or without vacuum. This ultrafine, spherical crystalline polymer powder can then be used directly in a powder bed fusing step, or can first be mixed with other polymer powders (either another crystalline polymers or an amorphous polymer, or a combination comprising at least one of the foregoing) or additives such as those listed below.

The powder composition used in the powder bed fusing step comprises between 50 to 100% by weight of the at least one at least partially crystalline powder, based on the weight of polymeric materials in the powder. Besides the crystalline polycarbonate or polyetherimide powders mentioned above, the powder composition can contain a colorant or a process aid or other additives such as those listed below.

In some embodiments, this powder composition can optionally contain a flow agent. In particular, a thermoplastic composition of the present invention contains 0%, preferably 0.01%, to 5%, and more preferably 0.05% to 1%, by weight of a particulate flow agent. Particularly, the powder composition contains 0.1% to 0.25%, by weight, of the flow agent.

This optional flow agent included in the powder composition is a particulate inorganic material having a median particle size of 10 microns or less, and is chosen from the group consisting of a hydrated silica, amorphous alumina, a glassy silica, a glassy phosphate, a glassy borate, a glassy oxide, titania, talc, mica, a fumed silica, kaolin, attapulgite, calcium silicate, alumina, and magnesium silicate. The flow agent preferably is present in an amount sufficient to allow the polyetherimide to flow and level on the build surface of the laser sintering device. One useful flow agent is fumed silica.

A powder composition also can contain other optional ingredients. These optional ingredients are particulate materials and include organic and inorganic materials, such as fillers and coloring agents. An optional ingredient is present in a sufficient amount to perform its intended function, without adversely affecting the thermoplastic composition or an article prepared therefrom. Optional ingredients have a particle size in the range of the particle sizes of the polymer powder or optional flow agent. Each optional ingredient is milled, if necessary, to the desired median particle size and particle size distribution.

Each individual optional ingredient, if present at all, typically is present in the powder composition in an amount of 0.1% to 30%, by weight, of the composition. The total amount of optional ingredients in the powder composition ranges from 0% up to 30%, by weight.

It is not necessary for each optional ingredient to melt during the laser sintering process. However, each optional ingredient must be compatible with the crystalline polymer in order to provide a strong and durable article of manufacture. The optional ingredient, therefore, can be inorganic, filler that imparts additional strength to the article of manufacture.

Another optional ingredient is a coloring agent, for example a pigment or a dye, like carbon black, to impart a desired color to the article of manufacture. The coloring agent is not limited, as long as the coloring agent does not adversely affect the composition or an article prepared therefrom, and is sufficiently stable to retain its color under conditions of the laser sintering process and during exposure to the laser.

Still other additional optional ingredients can also include, for example, toners, extenders, fillers, colorants (e.g., pigments and dyes), lubricants, anticorrosion agents, thixotropic agents, dispersing agents, antioxidants, adhesion promoters, light stabilizers, organic solvents, surfactants, flame retardants, anti-static agents, plasticizers a combination comprising at least one of the foregoing.

Still another optional ingredient also can be a second polymer that modifies the properties of the crystalline polycarbonate or polyetherimide powder.

For some embodiments, the crystalline polycarbonate or polyetherimide powders used herein can have certain characteristics. They can have a glass transition temperature of more than 100° C. and less than 350° C., more particular, they can have a glass transition temperature of more than 200° C. and less than 300° C. In some embodiments, the commercially available ULTEM polyether imide has a Tg of 215° C. They can have optionally comprises 1 to 20 weight percent of one or more amorphous polymer powder. They can have a weight average molecular weight of between 1,000 and 150,000 Daltons. Each powder can be monomodal and have a mean particle size of 10 to 100 microns. The powder can have a bulk density of greater than 0.4 grams per cubic centimeter (g/cc).

The following Examples further illustrate the above concepts.

Example 1—Formation of Crystalline Polycarbonate (PC)

Polycarbonate (PC) was made crystalline using the solvent induced crystallization (SINC) method in which ground PC (number average particle size 234 microns) was immersed in acetone for about 30 minutes. After this, the acetone was removed and the resulting ground PC powder, which becomes agglomerated, was dried overnight. In order to break up the agglomerates, the crystallized PC was ground yet another time and the final powder (number average particle size of 247 microns) was sieved (number average particle size 41 microns) in order to get fine powder that can be used in an SLS process.

The melting behavior of this crystalline PC polymer powder was measured using DSC and those results clearly showed that this SINC method results in a crystalline PC with a $T_m$ at 224° C. The results also showed that upon a second heating step to 300° C. this PC fine powder had returned to the amorphous phase, which is indicated by presence of Tg around 142° C. with an absence of $T_m$. This latter observation confirms that the crystalline polymer will revert to a second amorphous polymer upon a powder bed fusing step.

As mentioned above, any selective laser sintering (SLS) system for fabricating a part from a fusible powder, and in particular for fabricating the part from fusible crystalline polycarbonate powder. In this example, one thin layer of PC powder can be spread over the sintering chamber. The laser beam traces the computer-controlled pattern, corresponding to the cross-section slice of the CAD model, to melt the powders selectively which has been preheated to slightly below its melting temperature. After one layer of powder is sintered, the powder bed piston is lowered with a predetermined increment (typically 100 μm), and another layer of powder is spread over the previous sintered layer by a roller. The process then repeats as the laser melts and fuses each successive layer to the previous layer until the entire part is completed.

Example 2—Formation of Crystalline Polyetherimide (PEI)

Polyetherimide was made from the condensation reaction between an aromatic dianhydride and an aromatic diamine. In particular, equimolar amounts of bis-phenol A dianhydride and para-phenylene diamine were reacted in ortho-dichlorobenzene solvent, and the resulting polyetherimide polymer precipitated from the solvent. The precipitated polymer powder was filtered and dried to remove the solvent. That powder was friable and was mechanically ground to form 15 micron mean particle size powder. The powder exhibited crystallinity. In a first heating cycle, an exotherm around 275.25° C. was seen which is attributed to be the melting point. This first heating cycle do not show any glass transition temperature. In a second heating cycle, and glass transition temperature (Tg) was clearly observed around 225.68° C. There was no evidence for melting point in the second heating cycle, indicating the polymer has transformed from crystalline to second amorphous polymer, after the melting the polymer.

This application claims priority to U.S. Provisional Application No. 62/183,327, filed on Jun. 23, 2015, the entire disclosure of which is incorporated herein by reference.

The present invention is further illustrated by the following Embodiments.

Embodiment 1

A method of making an article, the method comprising converting a first amorphous polymer to an at least partially crystalline polymeric powder composition and powder bed fusing the at least partially crystalline polymer powder composition to form a three-dimensional article comprising a second amorphous polymer.

Embodiment 2

The method of Embodiment 1, wherein the crystallization process is solvent induced crystallization.

Embodiment 3

The method of Embodiment 1, wherein the crystallization process is vapor induced crystallization.

Embodiment 4

The method of Embodiment 1, wherein the crystallization process is plasticizer or nucleating agent (organic or inorganic) induced crystallization.

Embodiment 5

The method of any of Embodiments 1 to 4, wherein the powder bed fusing is selective laser sintering.

Embodiment 6

The method of any of Embodiments 1 to 5, wherein the first amorphous polymer is an amorphous polycarbonate polymer powder.

Embodiment 7

The method of Embodiment 6, wherein at least partially crystalline polycarbonate polymeric powder composition is made by a solvent induced crystallization process comprising immersing the first amorphous polycarbonate polymer powder in an organic solvent capable of transforming the amorphous polycarbonate polymer into a crystalline polycarbonate polymer; removing the organic solvent from the at least partially crystalline polycarbonate polymeric powder; and recovering at least partially crystalline polycarbonate powder mean particle size of 10 to 100 microns.

Embodiment 8

The method of Embodiment 7, wherein the solvent is acetone.

Embodiment 9

The method of any of Embodiments 1 to 5, wherein the first amorphous polymer is an amorphous polyetherimide polymer.

Embodiment 10

The method of any of Embodiments 1 to 9, wherein 80% to 100% by weight of the first amorphous polymer is converted to the crystalline polymer;

Embodiment 11

The method of any of Embodiments 1 to 10, further comprising adding a flow agent or to the at least partially crystalline powder composition.

Embodiment 12

The method of Embodiment 11, wherein the flow agent is a hydrated silica, amorphous alumina, a glassy silica, a glassy phosphate, a glassy borate, a glassy oxide, titania, talc, mica, a fumed silica, kaolin, attapulgite, calcium silicate, alumina, and magnesium silicate or a combination comprising at least one of the foregoing.

Embodiment 13

The method of any of Embodiments 11-12, wherein the amount of flow agent is 0.05% to 5% of the at least partially crystalline polymeric powder composition.

Embodiment 14

The method of any of Embodiments 1 to 13, further comprising applying size reduction techniques to the first amorphous polymer to an average particle size of 10 microns to 200 microns before converting the amorphous polymer to the crystalline polymer powder composition.

Embodiment 15

The method of any of Embodiments 1 to 13, further comprising applying size reduction techniques the crystalline polymer powder composition to reduce an average particle size of 10 microns to 100 microns before powder bed fusing the crystalline polymer powder composition.

Embodiment 16

The method of any of Embodiments 1 to 15, further comprising adding optional ingredients including, toners, extenders, fillers, colorants, lubricants, anticorrosion agents, thixotropic agents, dispersing agents, antioxidants, adhesion promoters, light stabilizers, organic solvents, surfactants, flame retardants, anti-static agents, plasticizers and mixtures thereof to the crystalline polymer powder composition.

Embodiment 17

A three-dimensional second amorphous polymer article resulting from the method of any of the Embodiments 1-14.

Embodiment 18

The article of Embodiment 17, wherein the second amorphous polymer is polycarbonate.

Embodiment 19

The article of Embodiment 17, wherein the second amorphous polymer is polyetherimide.

Embodiment 20

An article comprising a plurality of fused layers, wherein at least one of the layers of the second amorphous polymer comprises transparent amorphous polycarbonate or polyetherimide.

In general, the compositions, methods, and articles, and claims can alternately comprise, consist of, or consist essentially of, any appropriate components herein disclosed. The compositions, methods, and articles can additionally, or alternatively, be formulated so as to be devoid, or substantially free, of any components, materials, ingredients, adjuvants or species used in the prior art compositions or that are otherwise not necessary to the achievement of the function or objectives of the claims.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %." etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or". The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, or characteristic) described in connection with the embodiment is included in at least one embodiment described herein, and may or may not be present in other embodiments. In addition, it is to be understood that the described elements can be combined in any suitable manner in the various embodiments.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

The invention claimed is:

1. A method of making an article, the method comprising converting a first amorphous polymer to an at least partially crystalline polymeric powder composition and powder bed fusing the at least partially crystalline polymer powder composition to form a three-dimensional article comprising a second amorphous polymer; wherein the first amorphous polymer is a polycarbonate or polyetherimide polymer; and wherein the crystallization converting step comprises solvent induced crystallization, vapor induced crystallization or plasticizer or nucleating agent induced crystallization.

2. The method of claim 1, wherein the crystallization conversion step is solvent induced crystallization.

3. The method of claim 1, wherein the crystallization conversion step is vapor induced crystallization.

4. The method of claim 1, wherein the crystallization conversion step is plasticizer or nucleating agent induced crystallization.

5. The method of claim 1, wherein the powder bed fusing is selective laser sintering.

6. The method of claim 1, wherein the first amorphous polymer is an amorphous polycarbonate polymer powder.

7. The method of claim 6, wherein the at least partially crystalline polycarbonate polymeric powder composition is made by a solvent induced crystallization process comprising immersing the first amorphous polycarbonate polymer powder in an organic solvent capable of transforming the amorphous polycarbonate polymer into a crystalline polycarbonate polymer; removing the organic solvent from the at least partially crystalline polycarbonate polymeric powder; and recovering at least partially crystalline polycarbonate powder mean particle size of 10 to 100 microns.

8. The method of claim 7, wherein the solvent is acetone.

9. The method of claim 1, wherein the first amorphous polymer is an amorphous polyetherimide polymer.

10. The method of claim 1, wherein 80% to 100% by weight of the first amorphous polymer is converted to the crystalline polymer.

11. The method of claim 1, further comprising adding a flow agent to the at least partially crystalline powder composition.

12. The method of claim 11, wherein the flow agent is a hydrated silica, amorphous alumina, a glassy silica, a glassy phosphate, a glassy borate, a glassy oxide, titania, talc, mica, a fumed silica, kaolin, attapulgite, calcium silicate, alumina, magnesium silicate or a combination comprising at least one of the foregoing.

13. The method of claim 11, wherein the amount of flow agent is 0.05% to 5% of the at least partially crystalline polymeric powder composition.

14. The method of claim 1, further comprising applying size reduction techniques to the first amorphous polymer to obtain an average particle size of 10 microns to 200 microns before converting the amorphous polymer to the crystalline polymer powder composition.

15. The method of claim 1, further comprising applying size reduction techniques to the crystalline polymer powder composition to reduce an average particle size of 10 microns to an average particle size of 100 microns before powder bed fusing the crystalline polymer powder composition.

16. The method of claim 1, further comprising adding an optional ingredient to the crystalline polymer powder composition, wherein the optional ingredient is a, toner, extender, filler, colorant, lubricant, anticorrosion agent, thixotropic agent, dispersing agent, antioxidant, adhesion promoter, light stabilizer, organic solvent, surfactant, flame retardant, anti-static agent, plasticizer or a mixture thereof.

17. A three-dimensional second amorphous polymer article resulting from the method of claim 1.

18. The article of claim 17, wherein the second amorphous polymer is polycarbonate.

19. The article of claim 17, wherein the second amorphous polymer is polyetherimide.

20. The article of claim 17, comprising a plurality of fused layers, wherein at least one of the layers of the second amorphous polymer comprises transparent amorphous polycarbonate or polyetherimide.

* * * * *